Figure 1:
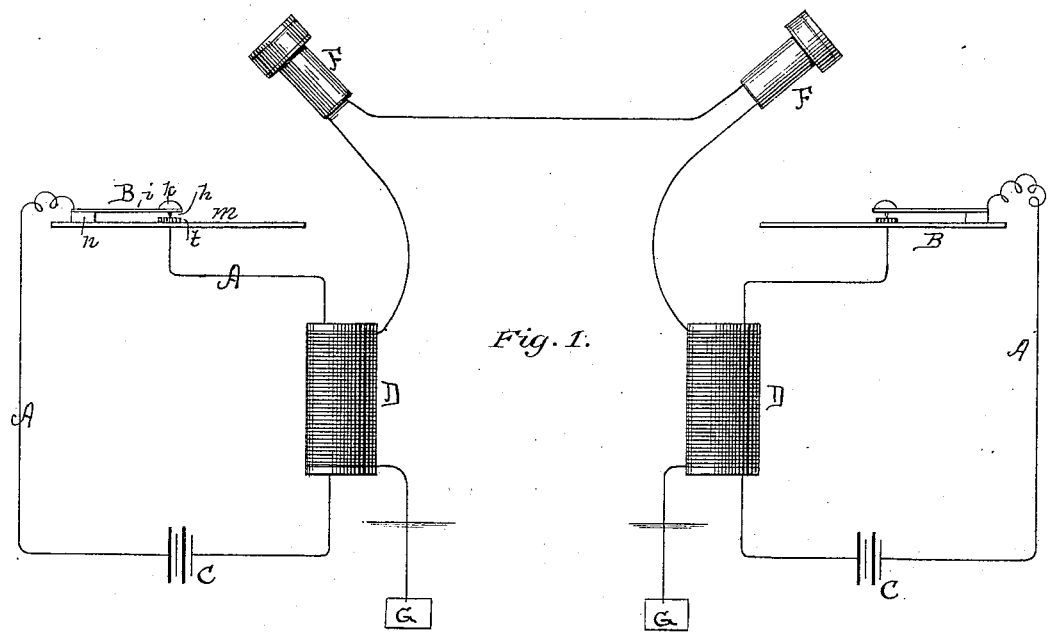
Figure 2:
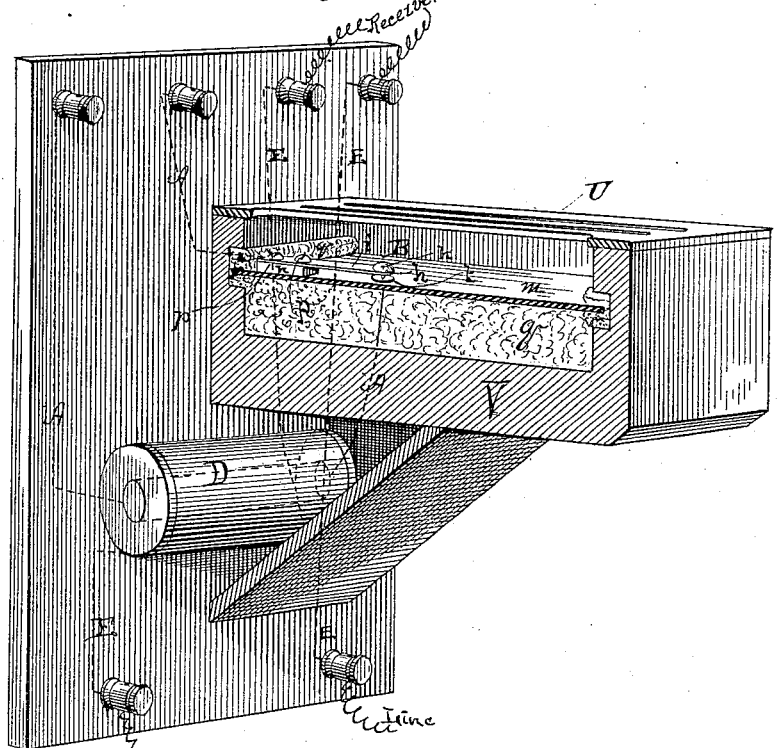

(Model.)

3 Sheets—Sheet 1.

J. H. IRWIN.
Telephone.

No. 234,579.

Patented Nov. 16, 1880.

Attest:
A. B. Smith
L. H. Marshall

Inventor:
John H. Irwin
By his Atty
R. D. Smith (Model.) 3 Sheets—Sheet 2.

J. H. IRWIN.
Telephone.

No. 234,579. Patented Nov. 16, 1880.

Attest:
A. B. Smith
L. H. Marshall

Inventor:
John H. Irwin
By his atty
R. D. O. Smith (Model.)　　　　　　　　　　　　　　　　　　3 Sheets—Sheet 3.

J. H. IRWIN.
Telephone.

No. 234,579.　　　　　　　Patented Nov. 16, 1880.

Attest:
A. B. Smith
L. H. Marshall

Inventor:
John H. Irwin
By his Atty
R. D. O. Smith

N. PETERS, PHOTO-LITHOGRAPHER, WASHINGTON, D. C.

UNITED STATES PATENT OFFICE.

JOHN H. IRWIN, OF MORTON, PENNSYLVANIA.

TELEPHONE.

SPECIFICATION forming part of Letters Patent No. 234,579, dated November 16, 1880.

Application filed September 27, 1880. (Model.)

*To all whom it may concern:*

Be it known that I, JOHN H. IRWIN, of Morton, in the county of Delaware and State of Pennsylvania, have invented a new and useful Improvement in Telephones, whereof the following is a full and exact description.

This invention relates to that class of telephones represented by my patents October 22, 1878, No. 209,266, and February 11, 1879, No. 212,144, wherein one electrode is held in contact with the other electrode by force of gravity modified by the counteracting force of an elastic body, and by my patents July 23, 1878, No. 206,241, and January 6, 1880, No. 223,352, wherein the sound-waves are received upon an expanded sonorous surface, called usually a "diaphragm;" and in this patent the subject-matter claimed relates, first, to the manner of mounting the gravity-electrode; second, to the manner of arranging the electrodes with reference to the surface or diaphragm; third, to the manner of mounting the receiver of sound-waves, or diaphragm.

That others may fully understand my invention, I will now particularly describe it as shown in the accompanying drawings, without, however, designing to limit myself to the exact details of structure shown, because they may be greatly varied without in any degree changing the effect produced.

It is to be understood that the instrument herein shown is designed for use as a transmitter in any ordinary telephonic circuit, and any proper telephonic receiver may be employed therewith; but the receiver shown in the drawings is of that class wherein a permanent magnet and disk armature is used.

A is the battery-wire, connecting the transmitter B in short circuit with the battery C. The primary of the induction-coil D is also included in this short circuit. This arrangement is to be repeated at each station.

The secondary wire E of the induction-coil D is extended at one end to form the line-wire connecting the stations, and the permanent-magnet receiver F is inserted in the line-circuit, as shown. The other end of the secondary wire may have connection with the ground, as at G. This completes the general description of the circuit, the arrangement of instruments being the same at one station as at another.

The transmitter B is composed of an electrode, $h$, provided with a contact-surface of platinum or other suitable material, mounted upon the end of an elastic reed, $i$, and weighted at the free end, as shown at $k$. The reed $i$ is fixed at its rear end, and the electrode $h$ is put in the circuit by elastic connection with said reed if the same is composed of a conducting material, or by a separate conductor if the reed is composed of a non-conducting material. The elasticity of the reed $i$ tends to lift the electrode, and the superimposed weight $k$ is sufficient to overcome the elasticity of the reed and maintain the proper contact of the electrodes. This contact is therefore the effect of the constant and unvarying force of gravity, and the counteracting force of a spring is a differential quantity capable of the most delicate adjustment by regulating the adjusting-screw $p$, or by other proper means, for securing the proper initial pressure.

The electrode $h$ is in contact with the electrode $t$, which is preferably formed of gas-carbon, mounted upon a receiver of sound-waves, composed in this instance of a thin "planchette," $m$, the edges of which are simply restrained from displacement by being confined by insulating-pads of some suitable fibrous material, such as buckskin, loose cotton, &c., as mentioned in my patent of March 9, 1880. A quantity of such fibrous material is also distributed under the planchette $m$ and subjected to some slight pressure, so that said planchette is brought into intimate contact all over with said fiber. The effect of this contact is, in a certain degree, to relieve the wood of its characteristic timbre and cause it more perfectly to simulate the timbre of the human voice. Wood is more perfectly adapted than metal for this purpose, because its characteristic timbre is less decided and persistent.

The fixed end of the reed $i$ is preferably secured to the surface of the planchette $m$ itself, and no disturbance of the relation of the electrodes will then occur if the planchette $m$ shall from any cause become displaced more or less upon its fibrous support.

It is necessary to interpose between the fixed end of the reed and its support upon the planchette $m$ a cushion of some elastic substance like india-rubber, which has great power to absorb vibrations. I therefore mount the fixed end of the reed *i* upon a block of india-rubber, *n*, and secure it there by a bolt, *p*, which passes downward through the reed, block *n*, and planchette *m* into a nut or other fastening, *q*, whereby the bolt may be tightened up from time to time, as required. A washer, *r*, of rubber, is also interposed between the nut *q* and the planchette *m*, to prevent the transmission of vibrations from the reed to the planchette *m* by that route.

I find it advantageous to make the reed *i* principally elastic near one point, instead of uniformly elastic throughout the length of its free end, and I therefore make it with a thin elastic part, as at *t*. The molecular vibration of the electrode therefore more nearly resembles the action of a hinged arm than that of a flexible strip, and the contact of the electrodes is less affected by lateral movements upon each other.

When this instrument is set up for use it is desirable that it shall be in the fullest manner accessible to sound-waves, and yet perfectly protected from accidental contact with objects which might injure or derange it. I therefore propose to extend over the planchette *m* and such parts of the instrument as require protection a cage or grating, U, though fancy or surrounding circumstances may make some other mode of protection more desirable in certain cases. The initial contact between the electrodes is secured by tightening or relaxing the bolt *p*, and after being once secured it will seldom require readjustment.

Figure 3:
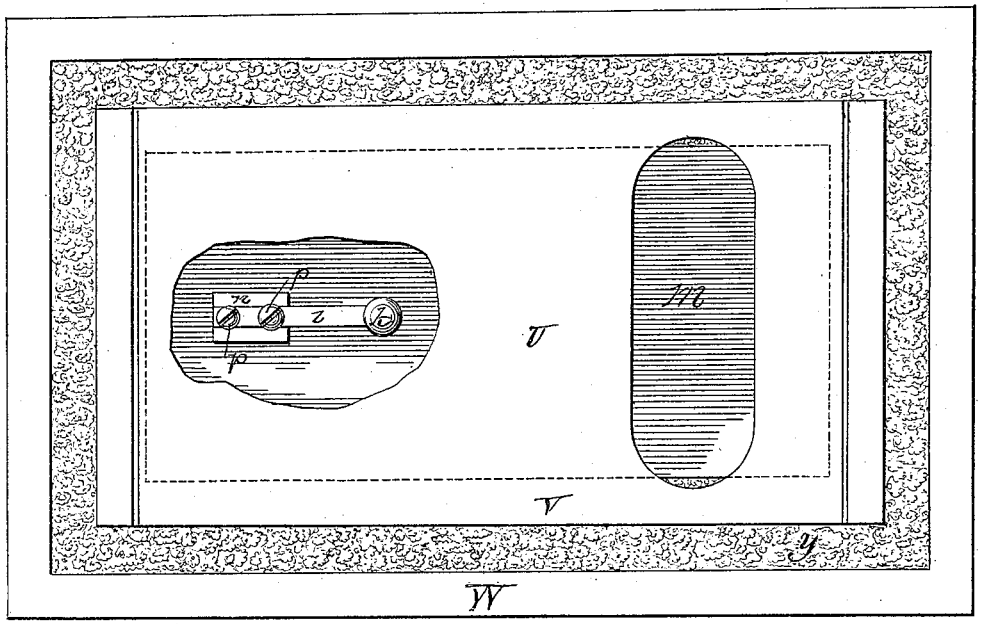
Figure 4:
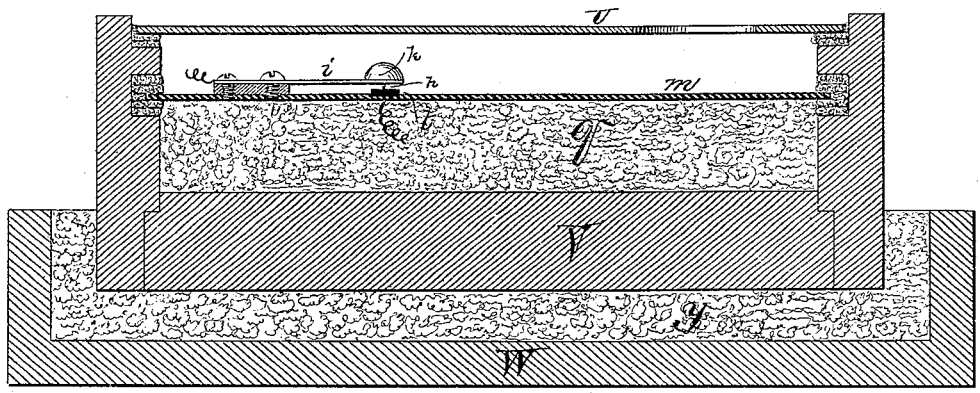
Figure 5:
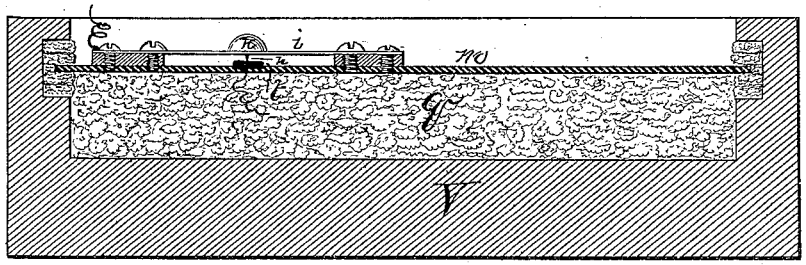
Figure 6:
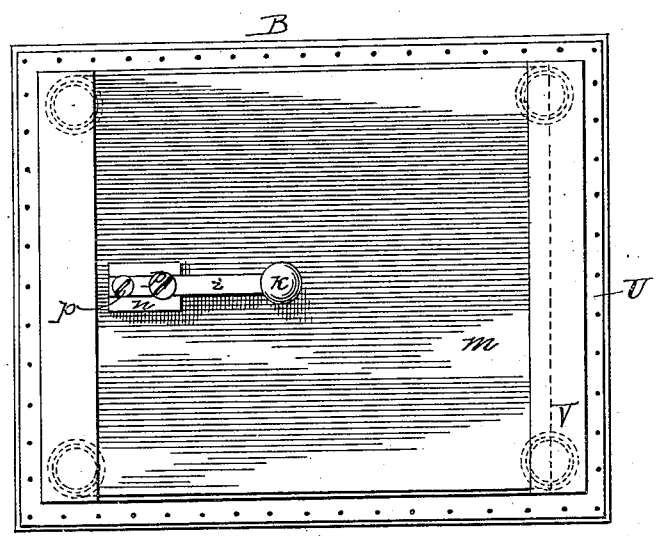

In Figs. 3 and 4 the instrument-casing V is shown packed in an exterior frame, W, with the interval *y* packed with the same insulating-fiber, so as to cut off and insulate the instrument perfectly from extraneous sounds conveyed through the solid supports upon which the instrument rests.

Figure 7:
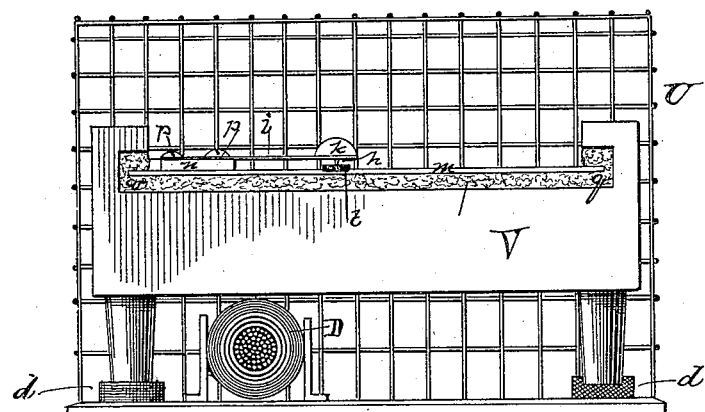
Figure 8:
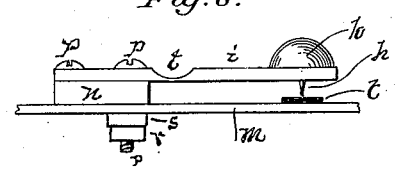

Fig. 7 represents, in elevation, an instrument set up for use, with legs mounted on insulating-pads of felt, soft rubber, &c., and protected by a wire cage or grating, U.

I do not claim herein a diaphragm having both electrodes mounted upon and in combination with the block connected to said diaphragm, the carbon spring, and weight, because that is the subject-matter of the claim in the original application of which this is a division.

Having described my invention, what I claim as new is—

1. In combination with one electrode in a telephone-transmitter, another electrode mounted upon the free end of an elastic reed, and provided with a superadded weight, whereby said electrodes are maintained in contact by gravity modified by the counteracting force of an elastic body.

2. In a telephone-transmitter, an electrode of platinum or other suitable refractory material, mounted upon the free end of an elastic reed, and a superadded weight, whereby said electrode is depressed by gravity modified by the counteracting force of an elastic body, combined with and in contact with another electrode of carbon, substantially as set forth.

3. In a telephone-transmitter, an electrode of platinum or other suitable refractory material, mounted upon the free end of an elastic reed, having a superadded weight, constituting a gravity-electrode in contact and combined with an electrode of gas-carbon fixed to the receiver of sound-waves, substantially as set forth.

4. In a telephone, a planchette receiver of sound-waves unclamped at the edges and supported upon some suitable fibrous substance, as described, having one of the electrodes mounted upon it and the other electrode held in contact therewith, substantially as set forth.

5. In a telephone, a planchette or receiver of sound-waves unclamped at its edges and supported upon some suitable fibrous material, as set forth, and provided with an electrode mounted upon its surface, combined with another electrode in contact therewith, supported upon the free end of a weighted reed, which is also mounted upon and secured to said receiver of sound-waves, substantially as set forth.

6. In a telephone, an electrode mounted upon the receiver of sound-waves, or planchette, and another electrode in contact therewith, mounted upon the free end of a weighted reed, combined with a supporting-cushion, *n*, interposed between the fixed end of said reed and said diaphragm, whereby vibrations are cut off and the said reed rendered adjustable.

7. In a telephone, an electrode mounted upon a receiver of sound-waves, or planchette, combined with another electrode in contact therewith, mounted upon the free end of a weighted reed, which is made thin and elastic at a point near to the fixed end.

JOHN H. IRWIN.

Witnesses:
F. A. WAIT,
WILLIAM L. VOELKER.